United States Patent
Maddalozzo, Jr. et al.

(10) Patent No.: US 6,728,675 B1
(45) Date of Patent: Apr. 27, 2004

(54) DATA PROCESSOR CONTROLLED DISPLAY SYSTEM WITH AUDIO IDENTIFIERS FOR OVERLAPPING WINDOWS IN AN INTERACTIVE GRAPHICAL USER INTERFACE

(75) Inventors: John Maddalozzo, Jr., Austin, TX (US); Gerald Francis McBrearty, Austin, TX (US); Johnny Meng-Han Shieh, Austin, TX (US)

(73) Assignee: International Business Machines Corporatiion, Armonk, NY (US)

(*) Notice: Subject to any disclaimer, the term of this patent is extended or adjusted under 35 U.S.C. 154(b) by 0 days.

(21) Appl. No.: 09/325,404

(22) Filed: Jun. 3, 1999

(51) Int. Cl.$^7$ .............................................. G10L 13/00
(52) U.S. Cl. ....................... 704/258; 704/275; 345/340; 434/116
(58) Field of Search ................................. 704/258, 260, 704/271, 272, 275; 345/340, 342, 352, 418; 434/116

(56) References Cited

U.S. PATENT DOCUMENTS

| | | | | |
|---|---|---|---|---|
| 5,186,629 A | * | 2/1993 | Rohen | 434/114 |
| 5,223,828 A | * | 6/1993 | McKiel, Jr. | 340/825.19 |
| 5,287,102 A | * | 2/1994 | McKiel, Jr. | 340/825.19 |
| 5,305,435 A | * | 4/1994 | Bronson | 395/351 |
| 5,699,082 A | * | 12/1997 | Marks et al. | 345/157 |
| 5,825,348 A | * | 10/1998 | Ludolph et al. | 345/115 |
| 5,826,051 A | * | 10/1998 | Porter et al. | 345/345 |
| 5,956,030 A | * | 9/1999 | Conrad et al. | 345/339 |
| 5,974,384 A | * | 10/1999 | Yasuda | 704/275 |
| 6,046,722 A | * | 4/2000 | McKiel, Jr. | 345/145 |
| 6,147,684 A | * | 11/2000 | Nielsen et al. | 345/344 |

* cited by examiner

*Primary Examiner*—Daniel Abebe
(74) *Attorney, Agent, or Firm*—J. B. Kraft; Volel Emile; Leslie Van Leeuwen

(57) ABSTRACT

There is provided a user friendly display interface system for the interactive handling and sorting out of windows in complex window hierarchical graphical user interfaces. The system provides for the storage of a hierarchy of windows which are displayable to overlap each other in a selected order whereby a plurality of said windows are partially visible. Apparatus is provided for displaying on a display screen a plurality of these partially overlapping windows. A different audio identifier is provided and stored for each of these windows. Further apparatus is provided for moving around and positioning a pointing device, such as a cursor on the display screen, in combination with means responsive to the pointing device for announcing the audio identifier for each window which said pointing device enters. The pointing device may be a user controlled cursor, a stylus or even a finger in touch sensitive display systems. The audio identifier may conveniently be the name in the title bar of the window.

12 Claims, 6 Drawing Sheets

| AUDIO TABLE | | |
|---|---|---|
| WINDOW | ANNOUNCEMENT | |
| 50 | "FREELANCE" | 60 |
| 51 | "CONTENT PAGES" | |
| 52 | "CONTROL PANEL" | 61 |
| 53 | "FREELANCE HELP" | |
| 54 | "NEW PAGES" | |
| 55 | "LOTUS SMART SUITE" | |
| 56 | "UNTITLED PAINT" | |

DATA PROCESSOR CONTROLLED DISPLAY SYSTEM WITH AUDIO IDENTIFIERS FOR OVERLAPPING WINDOWS IN AN INTERACTIVE GRAPHICAL USER INTERFACE

TECHNICAL FIELD

The present invention relates to user interactive computer supported display technology and particularly to graphical user interfaces which are user friendly and provide interactive users with an interface environment which is easy to use.

BACKGROUND OF RELATED ART

The 1990's decade has been marked by a technological revolution driven by the convergence of the data processing industry with the consumer electronics industry. This advance has been even further accelerated by the extensive consumer and business involvement in the Internet over the past two years. As a result of these changes, it seems as if virtually all aspects of human endeavor in the industrialized world require human-computer interfaces. There is a need to make computer directed activities accessible to a substantial portion of the world's population which, up to a few years ago, was computer-illiterate or, at best, computer indifferent. In order for the vast computer supported market places to continue and be commercially productive, it will be necessary for a large segment of computer indifferent consumers to be involved in computer interfaces.

With the increasing power of computers, functions and resources available to the interactive user have greatly increased. However, along with this increase in function has come a significant increase in the number and variety of windows available to the user in a display screen interface. This, of course, makes the interface much more complex with tens, and potentially hundreds, of available windows which contain the interactive data elements, such as icons. These are arranged in stacks of overlapping windows, the display of which is controlled and tracked through a multi-tiered display or frame buffer, such as the depth buffers described in U.S. Pat. No. 5,241,656.

In fact, the multi-tiered hierarchy of windows has become so extensive that they often are arranged in a plurality of desktop session levels. A desktop session is usually made up of several layers of overlapping windows which the depth frame buffer indexes and tracks. In addition, window interfaces are set up to handle additional desktop sessions of layered windows which are inactive and stored outside of the frame buffer, but which may be interactively moved into and out of the frame buffer as the sessions are activated. With such a complex arrangement, it will be obvious that at any given time a substantial number of windows will be wholly or partially buried or hidden by overlapping windows.

When windowing environments were originally developed, the interactive user had to deal with no more than a handful of windows. From that time on, it became customary to identify each window with a title bar including the name or title of the window. With so few windows, even if there was some overlap, it was simple for the user to shift a window with his cursor so as to expose the title bar and identify the window. At the present time, with the number and the complicated hierarchies of windows described above, it is often a tedious and difficult task for the user to shift or drag the displayed windows to expose enough of the title bars to identify the respective windows. The present invention offers an implementation to simplify such window identification.

SUMMARY OF THE PRESENT INVENTION

The present invention provides a user friendly display interface system for the interactive handling and sorting out of windows in complex window hierarchical graphical user interfaces. The system provides for the storage of a hierarchy of windows which are displayable to overlap each other in a selected order, whereby a plurality of said windows are partially visible. Means are provided for displaying, on a display screen, a plurality of these partially overlapping windows. A different audio identifier is provided and stored for each of these windows. Means are provided for moving around and positioning a pointing device, such as a cursor, on the display screen in combination with means responsive to the pointing device for announcing the audio identifier for each window which said pointing device enters. The pointing device may be a user controlled cursor, a stylus or even a finger in touch sensitive display systems. The audio identifier may conveniently be the name in the title bar of the window.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
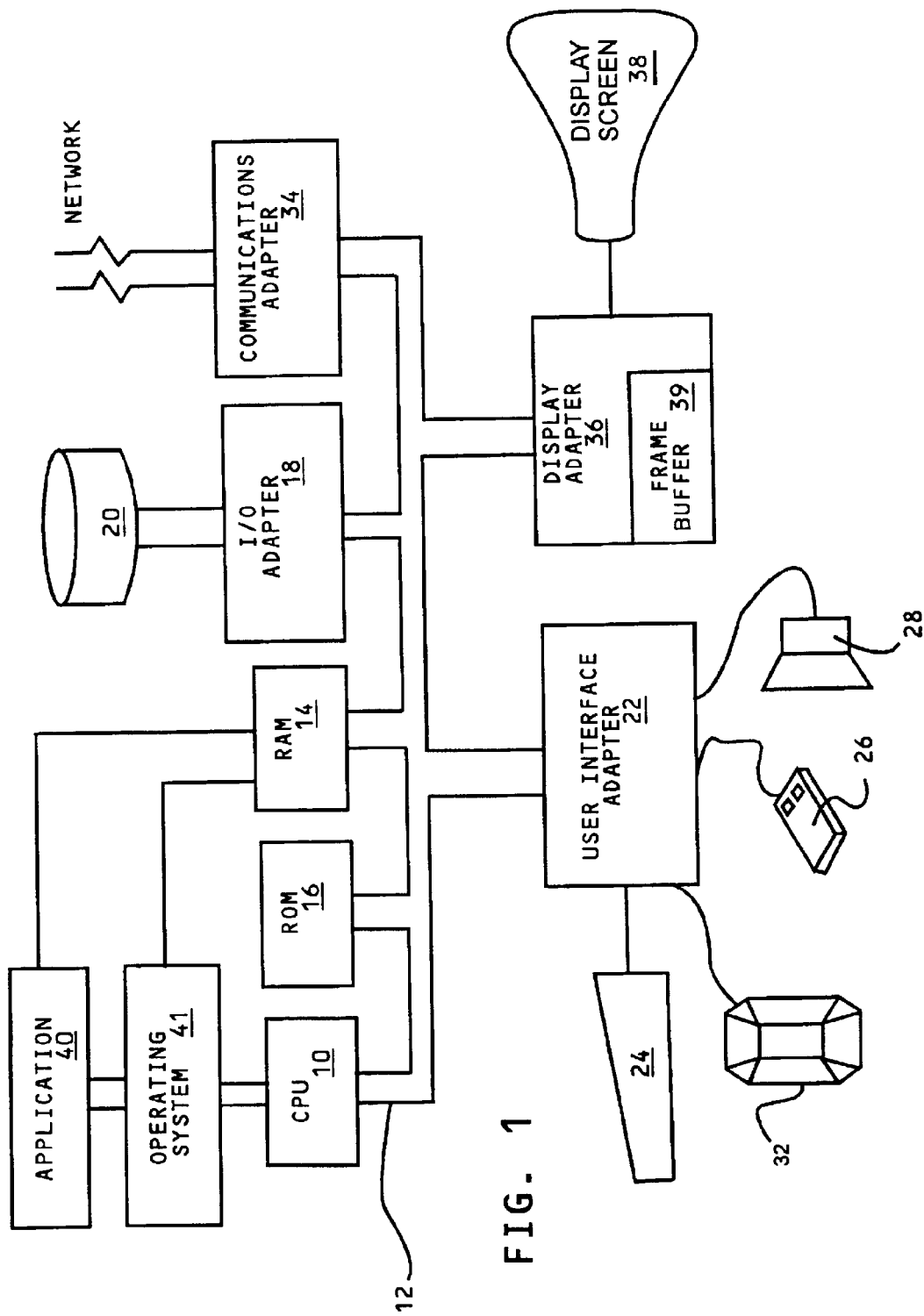
FIG. 1 is a block diagram of an interactive data processor controlled display system including a central processing unit which is capable of implementing the audio window identification and announcement of the present invention.

Referring to FIG. 1, a typical data processing system is shown which may function as the computer controlled display terminal used in controlling the window stack hierarchies processed in accordance with the present invention and for providing the audio storage and announcement of windows as the windows are entered by pointing devices. A central processing unit (CPU) 10, such as one of the PC microprocessors, distributed by International Business Machine Corporation (IBM), or workstations, e.g. RISC System/6000(™) (RS/6000) (RISC System/6000 is a trademark of International Business Machines Corporation) series available from IBM is provided and interconnected to various other components by system bus 12. An operating system 41 runs on CPU 10, provides control and is used to coordinate the function of the various components of FIG. 1. Operating system 41 may be one of the commercially available windows type of operating systems such as the AIX 6000(™) operating system or OS/2(™) operating system available from IBM (AIX 6000 and OS/2 are trademarks of International Business Machines Corporation); Microsoft's Windows 98(™) or Windows NT(™), as well as UNIX and AIX operating systems. Application programs 40, controlled by the system, are moved into and out of the main memory, Random Access Memory (RAM), 14. These programs include the program of the present invention to be subsequently described in providing audio identifiers for the windows. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. It should be noted that software components including the operating system 41 and the application 40 are loaded into RAM 14, which is the computer system's main memory. I/O adapter 18 may be a small computer system adapter that communicates with the disk storage device 20, i.e. a hard drive. Communications adapter 34 interconnects bus 12 with an outside network enabling the data processing system to communicate with other such systems. In present day systems, windowed data may be transmitted from other computer stations in a network, such the Internet.

I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. As previously mentioned, in order to accommodate the hierarchies of overlapping and hidden windows, the frame buffer 39 should be a depth buffer, for example the depth buffer of U.S. Pat. No. 5,241,565. By using the aforementioned I/O devices, a user is capable of inputting information to the system through the keyboard 24, trackball 32 or mouse 26 and receiving output information from the system via speaker 28 and display 38. It is, of course, through speaker 28 that the windows which the pointing device or cursor enters will be announced to the interactive user.

Figures 2, 5:
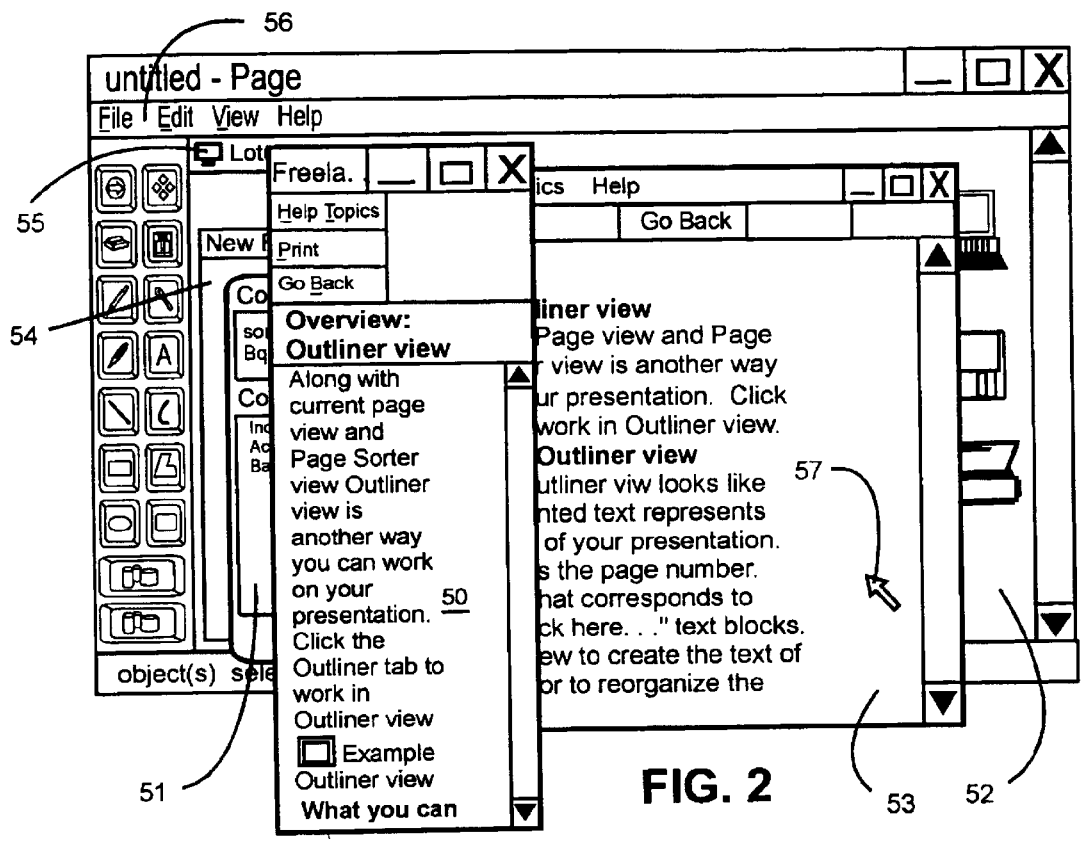
FIG. 2 is a diagrammatic view of a display screen illustrating a stack or hierarchy of windows which will be used to illustrate the present invention involving audio identification of each of the windows in the stack and showing the pointing device, i.e. cursor in one of the windows.
FIG. 5 is a diagrammatic conceptual view of the stored table relating each of the windows in FIG. 3 to its stored audio identifier.
Figure 3:
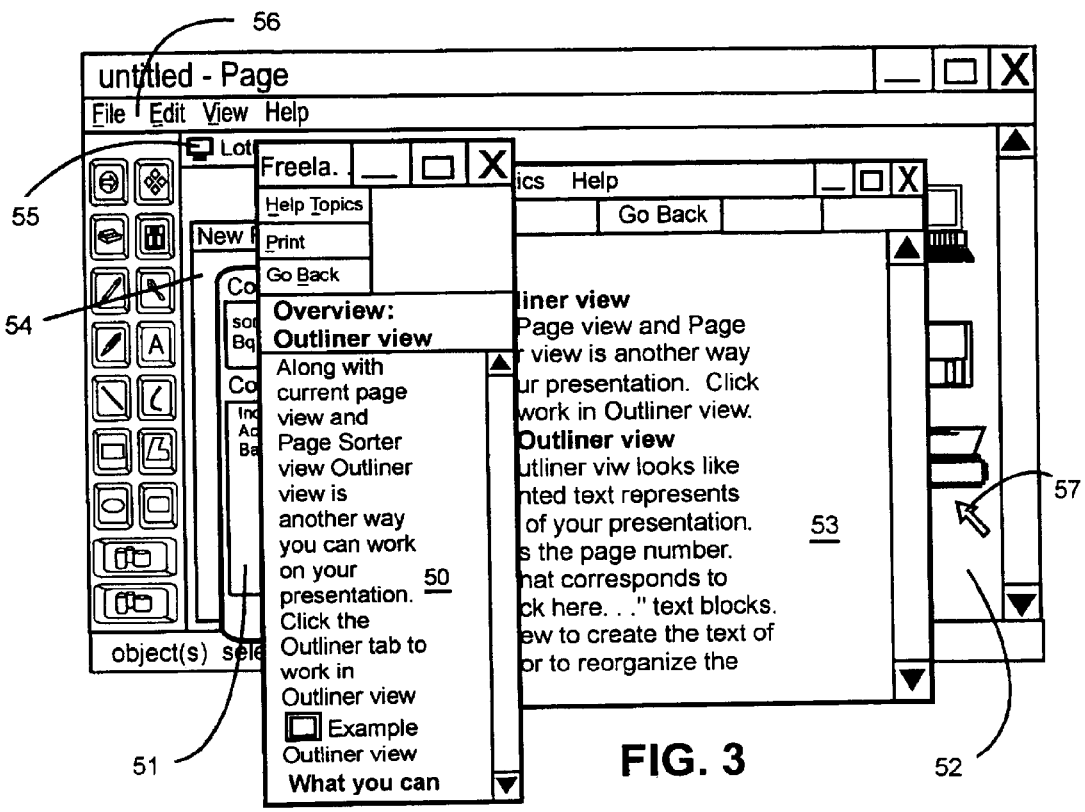
FIG. 3 is the same diagrammatic view of the display screen of FIG. 2 with the cursor moved into another window.
Figure 4:
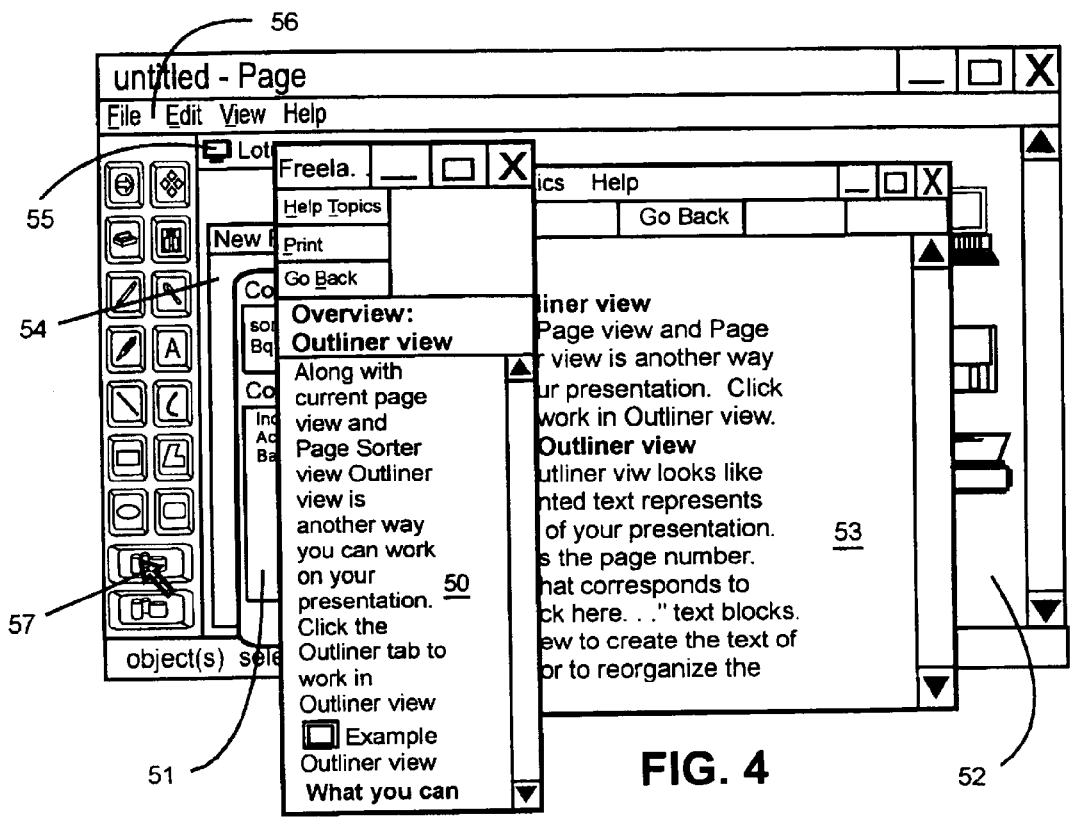
FIG. 4 is the same diagrammatic view of the display screen of FIG. 3 with the cursor moved into still another window.

There will now be described a simple illustration of the present invention with respect to the display screens of FIGS. 2 through 4. When the screen images are described, it will be understood that these may be rendered by storing image and text creation programs, such as those in any conventional window operating system in the RAM 14 of the system of FIG. 1. The operating system is diagrammatically shown in FIG. 1 as operating system 41. The display screens of FIGS. 2 through 4 are presented to the viewer on display monitor 38 of FIG. 1. In accordance with conventional techniques, the user may control the screen interactively through a conventional I/O device such as mouse 26 of FIG. 1, which operates through user interface 22 to call upon programs in RAM 14 cooperating with the operating system 41 to create the images in frame buffer 39 of display adapter 36 to control the display on monitor 38. As stated hereinabove, the audio announcements of the specific window I.D. are made through speaker 28.

With reference to FIG. 2, a hierarchy, or stack, of overlapping windows, many of which are partially hidden, occupies the screen. For convenience of illustration, some objects or icons and text have been removed from underlying windows and only a portion of the icons are shown in uppermost window 50. The remaining partially visible windows in the stack are windows 51, 52, 53, 54, 55 and 56. Each of these windows may be visually identified by their names in their title bars at the tops of the respective windows. In accordance with this invention, the names of the windows are recorded in the computer's audio system and stored as the table 60 shown in FIG. 5 in which the names of the respective windows 50 through 56 are stored as a respective plurality of announcements 61 which will be announced as cursor 57 first enters each window. Thus, in FIG. 2, since cursor 57 is in window 53, the audio announcement would have been "Freelance Help" when the cursor first entered this window. Then, as shown in FIG. 3, when cursor 57 first enters window 52, the announcement would be "Control Panel", and as shown in FIG. 4, when cursor 57 first enters window 56, the announcement would be "Untitled Paint".

Figure 6:
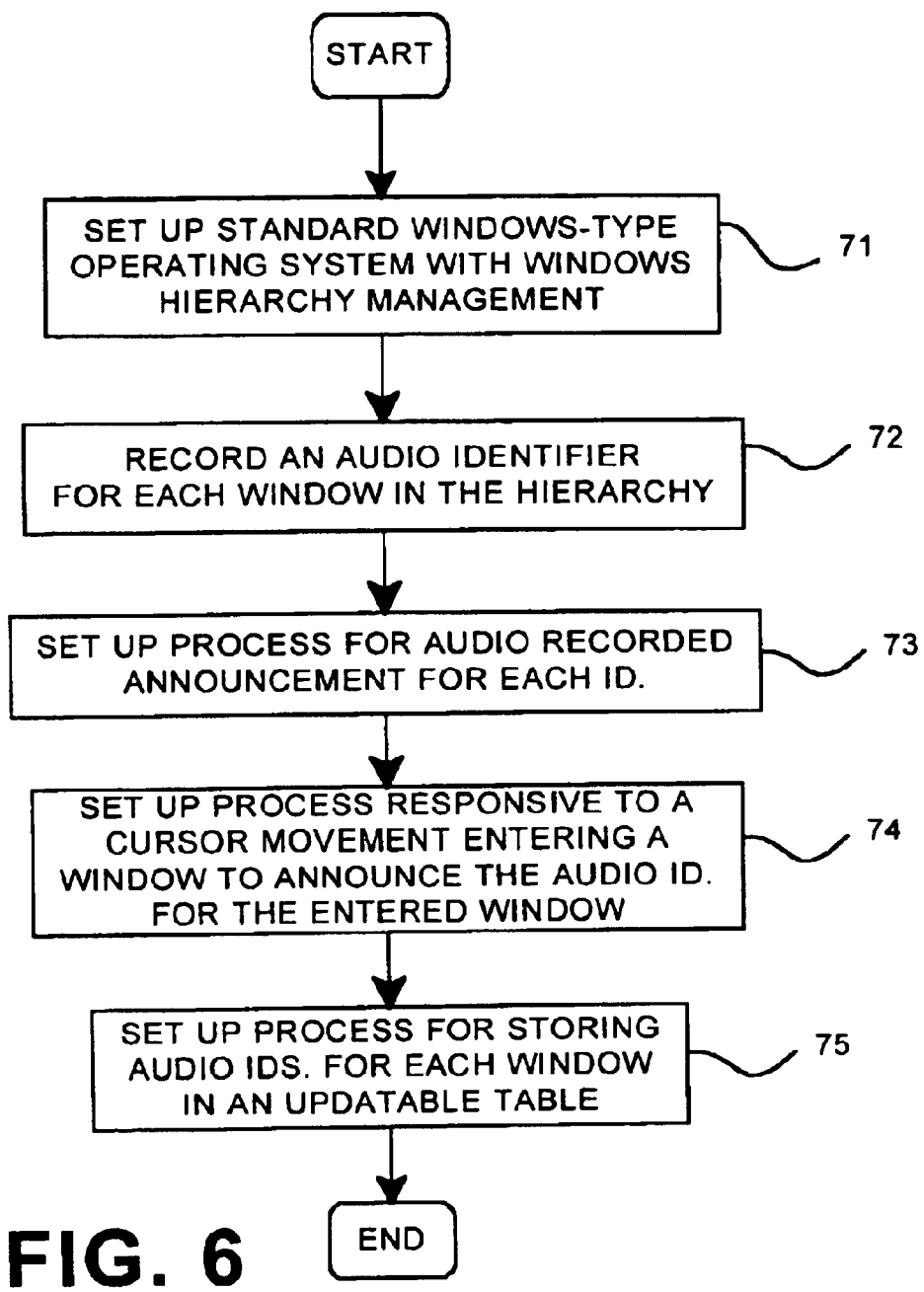
FIG. 6 is a flowchart of the program steps involved in setting up the audio window identification system of the present invention.

Now, with reference to FIG. 6, we will describe a process implemented by a program according to the present invention for dynamically making an audio announcement of the name of a window every time a cursor enters a window in a window hierarchy. The program routines, which are created by the process of FIG. 6, implement the operations described with respect to FIGS. 2 through 5. In the flowchart of FIG. 6, a basic type operating system is set up, step 71, using any operating system for managing a hierarchy of windows, e.g. Windows95(™), OS/2(™) and Motif for Unix or AIX. Then, a process is provided for recording and storing an audio identifier for each window in the window hierarchy, step 72. Conveniently, this identifier could be the name of the respective window which appears in the window title box. Then, a process is set up for making a recorded audio announcement of each identifier, step 73. A process is set up, step 74, which is responsive to a cursor movement entering a window for an audio announcement of the audio I.D. for the window which has been entered. This announcement comes from and is supported by an updatable table which stores the audio I.D.'s, step 75.

Figure 7:
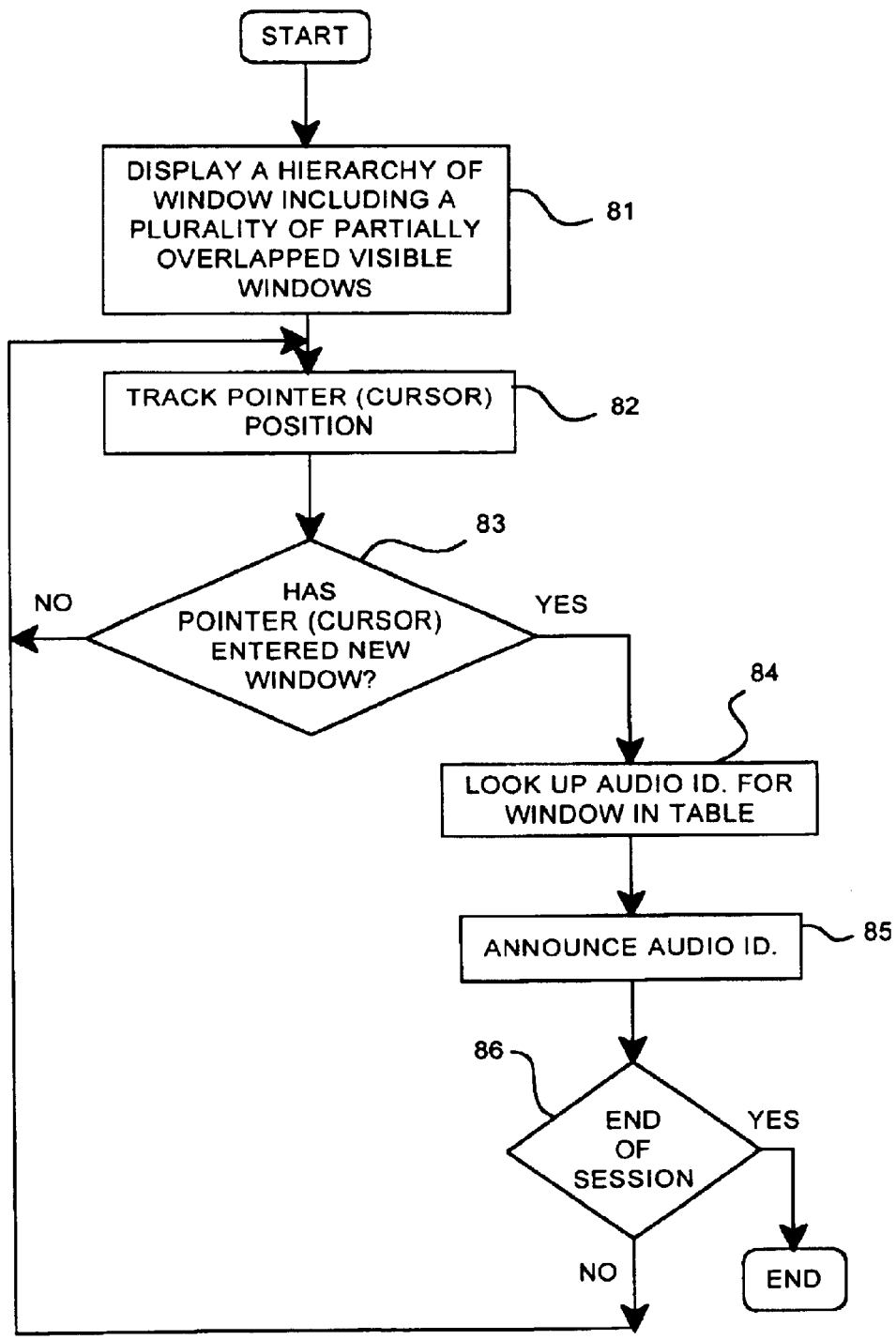
FIG. 7 is a flowchart of an illustrative running of the steps set up in the program of FIG. 6.

Now that the basic program has been described and illustrated, there will be described with respect to FIG. 7 a flow of a simple operation showing how the program could be run for audio announcement of the respective I.D.'s for a plurality of windows. First, step 81, there is displayed a hierarchy of windows, many of which are partially overlapped and visible. The cursor or other pointing device position is tracked by the process already used by the window operating system for this purpose, step 82. A determination is made, step 83, as to whether the cursor has entered a new window. If No, the process is returned to step 82 and the tracking of the cursor is continued. If Yes, then the audio I.D. for the entered window is looked up in the table of FIG. 5, step 84, and that audio I.D. is announced, step 85. Then, a determination is made as to whether the session is over, step 86. If Yes, the session is ended. If No, then the process is returned to step 82 and the tracking of the cursor is continued as described above.

Best results are achieved when the text names of the windows are directly converted to speech output by conventionally available systems for directly reading the code representative of the text and converting such code to audio output. Such text to audio output systems are described in U.S. Pat. No. 3,704,345, Coker et.al.; U.S. Pat. No. 4,398,058, Lin et al.; U.S. Pat. No. 4,278,838, Anotov et al. With such systems, the title boxes or other text identifiers in the individual windows are read and dynamically converted when the window is activated. Alternatively, the text in the table of FIG. 5 could be read as needed and converted to speech output.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a local area network (LAN) or a wide area network (WAN), such as the Internet, when required by the user of the present invention.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled interactive display system comprising:
   means for displaying on a display screen a hierarchy of windows which overlap each other whereby visual identifiers of a plurality of said windows are hidden,
   means for providing an audio identifier for each window in said hierarchy,
   means for positioning a pointing device on said display screen, and
   means responsive to said pointing device for announcing the audio identifier for each window which said pointing device enters.

2. The display system of claim 1 wherein said pointing device is a user controlled cursor.

3. The display system of claim 1 wherein said pointing device is a stylus.

4. The display system of claim 1 wherein said audio identifier comprises at least a portion of the window name appearing in the title bar of the window.

5. A method of identifying partially hidden windows in a computer controlled interactive display comprising:
   displaying on a display screen a hierarchy of windows which overlap each other whereby visual identifiers of a plurality of said windows are hidden,
   providing an audio identifier for each window in said hierarchy,
   positioning a pointing device on said display screen, and
   responsive to said positioning, announcing the audio identifier for each window which said pointing device enters.

6. The method of claim 5 wherein said positioning of said pointing device is carried out through a user controlled cursor.

7. The method of claim 5 wherein said positioning of said pointing device is carried out through a user stylus.

8. The method of claim 1 wherein said audio identifier comprises at least a portion of the window name appearing in the title bar of the window.

9. A computer controlled display program having program code included on a computer readable medium for the interactive control of a display system comprising:
   means for displaying on a display screen a hierarchy of windows which overlap each other whereby visual identifiers of a plurality of said windows are hidden,
   means for providing an audio identifier for each window in said hierarchy,
   means for positioning a pointing device on said display screen, and
   means responsive to said pointing device for announcing the audio identifier for each window which said pointing device enters.

10. The computer program of claim 9 wherein said pointing device is a user controlled cursor.

11. The computer program of claim 9 wherein said pointing device is a stylus.

12. The computer program of claim 9 wherein said audio identifier comprises at least a portion of the window name appearing in the title bar of the window.

* * * * *